US012739487B2

(12) United States Patent
Harada et al.

(10) Patent No.: US 12,739,487 B2
(45) Date of Patent: Sep. 15, 2026

(54) VEHICULAR CAMERA

(71) Applicant: Panasonic Automotive Systems Co., Ltd., Kanagawa (JP)

(72) Inventors: Takeshi Harada, Kanagawa (JP); Haruki Ishida, Kanagawa (JP); Masayuki Yoshie, Aichi (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 105 days.

(21) Appl. No.: 18/960,770

(22) Filed: Nov. 26, 2024

(65) Prior Publication Data

US 2025/0193503 A1 Jun. 12, 2025

(30) Foreign Application Priority Data

Dec. 6, 2023 (JP) ................................ 2023-206404

(51) Int. Cl.

| | |
|---|---|
| ***H04N 23/54*** | (2023.01) |
| ***G03B 30/00*** | (2021.01) |
| ***H04N 23/51*** | (2023.01) |

(52) U.S. Cl.

CPC ............ *H04N 23/54* (2023.01); *G03B 30/00* (2021.01); *H04N 23/51* (2023.01)

(58) Field of Classification Search

CPC ........ H04N 23/54; H04N 23/51; H04N 23/52; H04N 23/55; H04N 23/57; G03B 30/00

See application file for complete search history.

(56) References Cited

U.S. PATENT DOCUMENTS

2023/0008374 A1 1/2023 Owaki

FOREIGN PATENT DOCUMENTS

WO WO 2021125074 A1 6/2021

*Primary Examiner* — Gevell V Selby

(74) *Attorney, Agent, or Firm* — Seed Intellectual Property Law Group LLP

(57) ABSTRACT

A vehicular camera includes a lens unit, a circuit board, an imaging element, a housing supporting the lens unit and accommodating the circuit board and the imaging element, a shield made of metal that is disposed in an internal space of the housing to surround the circuit board, and a resin member that contains a magnetic material, has a predetermined thermal conductivity, and is disposed between the circuit board and a first bottom surface portion of the shield in a manner of extending over an entire circumference of the hole including a central portion of a second shape of the first bottom surface portion of the shield. The resin member is in contact with a second surface of the circuit board, first to fourth side surface portions of the shield, and first bottom surface portion of the shield.

20 Claims, 15 Drawing Sheets

FIG. 15
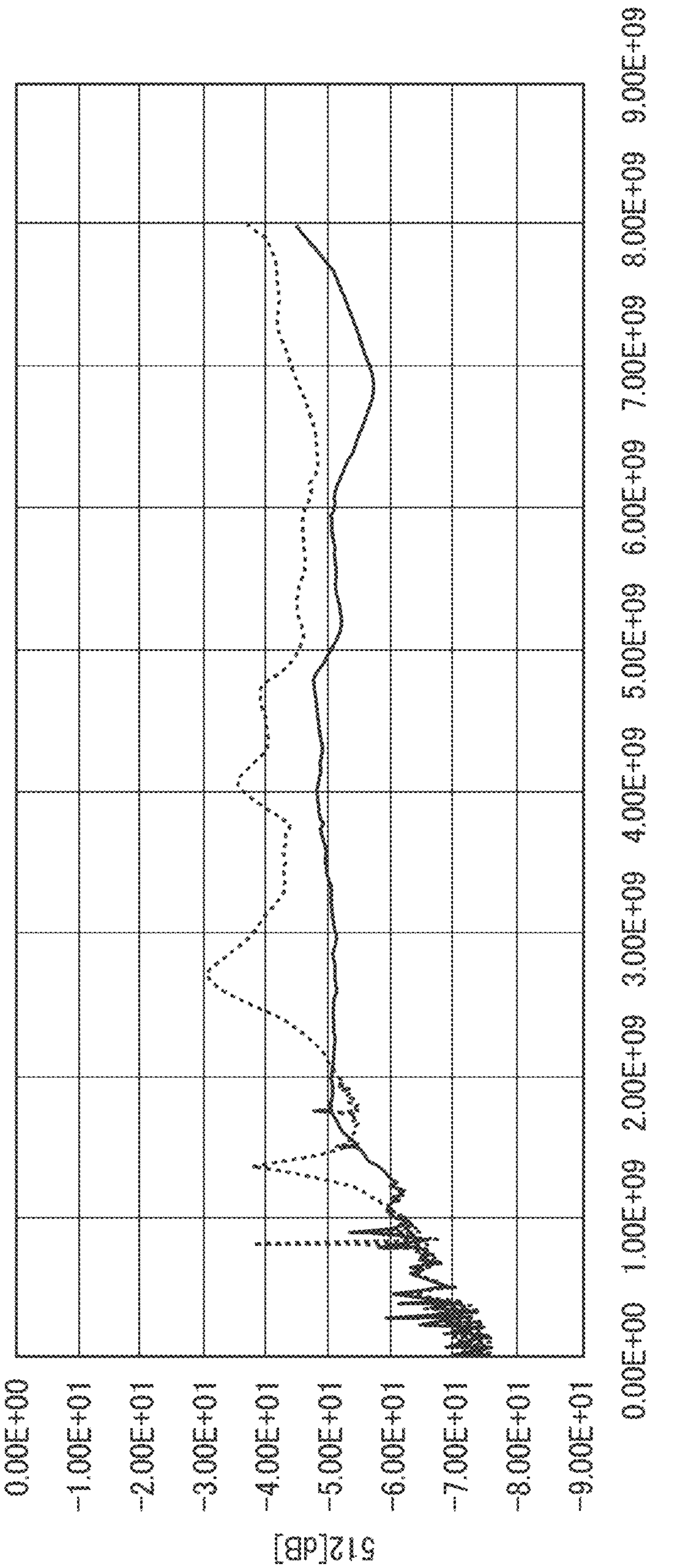

VEHICULAR CAMERA

CROSS-REFERENCE TO RELATED APPLICATIONS

This application is based on and claims priority under 35 USC 119 from Japanese Patent Application No. 2023-206404 filed on Dec. 6, 2023, the entire content of which is incorporated herein by reference.

TECHNICAL FIELD

The present disclosure relates to a vehicular camera.

BACKGROUND ART

With demands for improvements in vehicle safety, introduction of autonomous driving functions and the like in recent years, development of vehicular cameras that are mounted on vehicles and capture the inside and outside of the vehicles have become active (for example, see Patent Literature 1).

CITATION LIST

Patent Literature

Patent Literature 1: WO2021/125074

SUMMARY OF INVENTION

Required levels relating to safety, automatic driving functions, and the like, which are required for vehicles, are improved, and further improvement in performance and the like are also required for vehicular cameras.

The present disclosure relates to a technique for providing a new vehicular camera.

The present disclosure provides a vehicular camera including:

a lens unit including at least one lens;

a circuit board having a first surface, a second surface opposite to the first surface, and an end surface disposed between the first surface and the second surface;

an imaging element electrically connected to a circuit of the circuit board and disposed on an optical axis of the at least one lens;

a housing configured to support the lens unit and accommodate at least the circuit board and the imaging element; and a shield made of metal that is disposed in an internal space of the housing to surround the circuit board, in which the circuit board has a first shape that includes at least a first side, a second side, a third side, and a fourth side in a plan view of the circuit board, the end surface of the circuit board includes at least a first end surface corresponding to the first side, a second end surface corresponding to the second side, a third end surface corresponding to the third side, and a fourth end surface corresponding to the fourth side, the housing includes a connector disposed on a bottom surface facing the circuit board in a manner of extending over an inside and an outside of the housing, the connector includes at least a first terminal and a second terminal that electrically connect the inside and the outside of the housing, and the first terminal and the second terminal of the connector are electrically connected to the circuit of the circuit board, the shield includes a first bottom surface portion that is disposed to face the second surface of the circuit board, has a second shape including at least a fifth side, a sixth side, a seventh side, and an eighth side in a plan view of the shield, and includes a hole disposed to include a central portion of the second shape, a second bottom surface portion that is disposed to correspond to the hole disposed to include the central portion of the second shape of the first bottom surface portion, face the second surface of the circuit board, and is disposed to be separated from the first bottom surface portion with reference to the second surface of the circuit board, a first side surface portion disposed to correspond to the fifth side of the first bottom surface portion in a direction opposite to the second bottom surface portion, a second side surface portion disposed to correspond to the sixth side of the first bottom surface portion in the direction opposite to the second bottom surface portion, a third side surface portion disposed to correspond to the seventh side of the first bottom surface portion in the direction opposite to the second bottom surface portion, a fourth side surface portion disposed to correspond to the eighth side of the first bottom surface portion in the direction opposite to the second bottom surface portion, and a connection portion configured to connect an entire periphery of the hole disposed to include the central portion of the second shape of the first bottom surface portion and an entire periphery of the second bottom surface portion, the second bottom surface portion of the shield corresponds to the bottom surface of the housing, the connector is disposed to penetrate the second bottom surface portion of the shield, at least a part of the first side surface portion of the shield faces the first end surface of the circuit board, at least a part of the second side surface portion of the shield faces the second end surface of the circuit board, at least a part of the third side surface portion of the shield faces the third end surface of the circuit board, at least a part of the fourth side surface portion of the shield faces the fourth end surface of the circuit board, the hole disposed to include the central portion of the second shape of the first bottom surface portion of the shield has a third shape in the plan view of the shield, the vehicular camera further comprises a resin member that contains a magnetic material, has a predetermined thermal conductivity, and is disposed between the circuit board and the first bottom surface portion of the shield in a manner of extending over an entire circumference of the hole including the central portion of the second shape of the first bottom surface portion of the shield, and the resin member is in contact with the second surface of the circuit board, the first side surface portion of the shield, the second side surface portion of the shield, the third side surface portion of the shield, the fourth side surface portion of the shield, and the first bottom surface portion of the shield.

According to the present disclosure, the resin member is in contact with the circuit board and the shield and blocks a gap that may be a path of electromagnetic waves, and thus radiation or inflow of noise can be effectively prevented. Since the resin member itself contains the magnetic material, the resin member has a function of blocking or absorbing noise. Thus, the resin member can exhibit not only a heat dissipation effect but also a noise shielding effect, and high reliability of the vehicular camera can be ensured.

BRIEF DESCRIPTION OF DRAWINGS

FIG. 15 is a graph illustrating an intensity of noise leaking from the vehicular camera to outside.

DESCRIPTION OF EMBODIMENTS

Hereinafter, embodiments that specifically disclose a vehicular camera according to the present disclosure will be described in detail with reference to the drawings as appropriate. However, unnecessarily detailed descriptions may be omitted. For example, detailed descriptions of already well-known matters and redundant descriptions of substantially the same configuration may be omitted. This is to avoid unnecessary redundancy of the following description and facilitate understanding of those skilled in the art. It should be noted that the accompanying drawings and the following description are provided for those skilled in the art to sufficiently understand the present disclosure, and are not intended to limit the subject matter described in the claims.

(Vehicle on which Vehicular Camera is Mounted)

Figure 1:
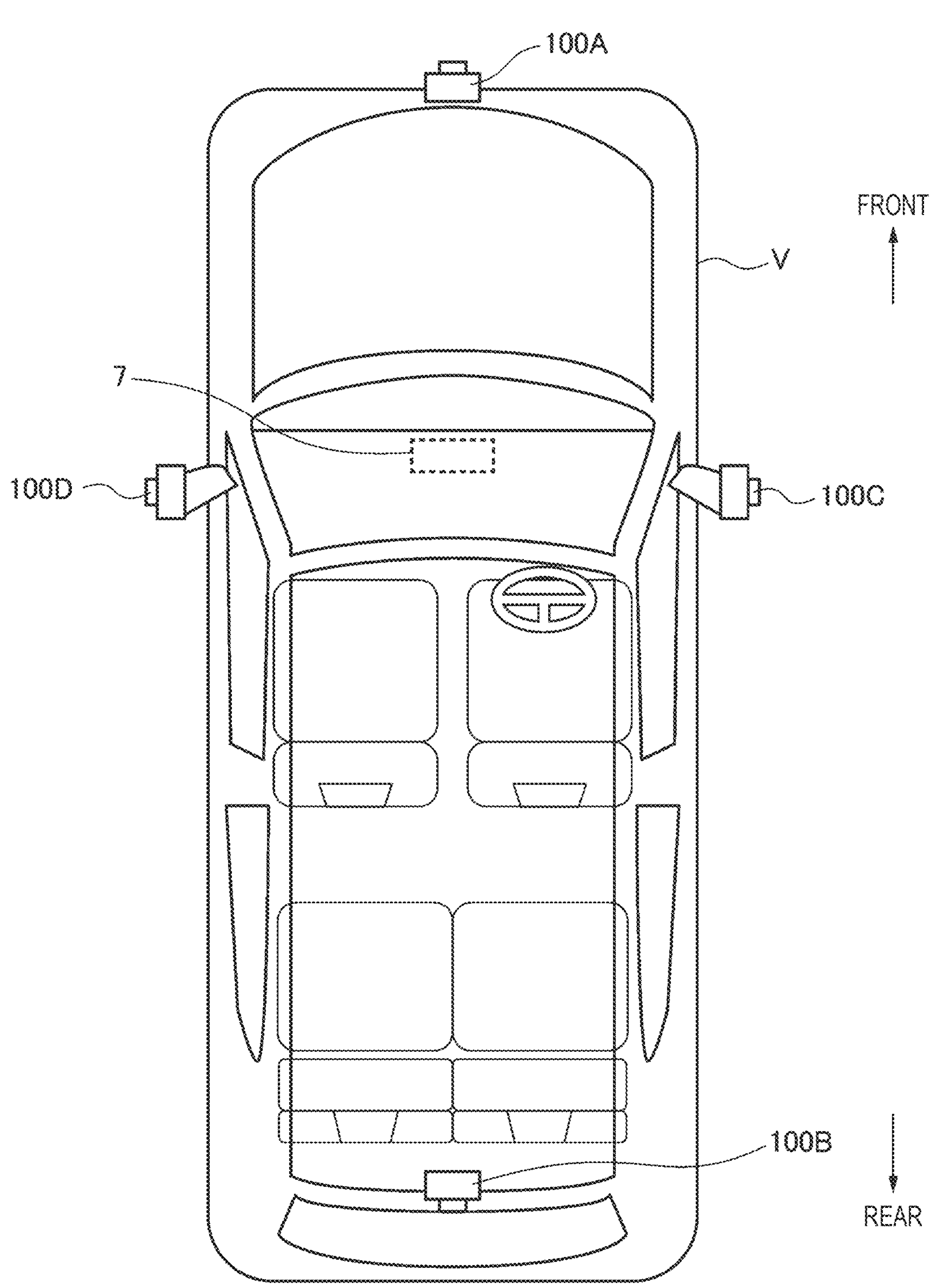
FIG. 1 is an example of a vehicle, and is a top view of the vehicle on which vehicular cameras are mounted.

FIG. 1 is an example of a vehicle, and is a top view of the vehicle on which vehicular cameras are mounted. As a vehicular camera 100, a vehicular camera 100A, a vehicular camera 100B, a vehicular camera 100C, and a vehicular camera 100D are mounted on a vehicle V. The vehicular camera 100A is a front camera, the vehicular camera 100B is a rear camera, the vehicular camera 100C is a right side camera, and the vehicular camera 100D is a left side camera. The vehicular cameras 100A to 100D are, for example, wide-angle cameras having an angle of view of about 180°, and are disposed to capture images showing an entire periphery of the vehicle V.

For example, the vehicular camera 100A is provided in a front grille of the vehicle V, and captures an image of a front region in a direction of looking down obliquely with respect to the ground. The vehicular camera 100B is provided in a roof spoiler of the vehicle V, and captures an image of a rear region in a direction of looking down obliquely with respect to the ground. The vehicular camera 100C and the vehicular camera 100D are provided in side mirrors of the vehicle V, and capture images of lateral regions in directions of looking down obliquely with respect to the ground, respectively.

Figure 2:
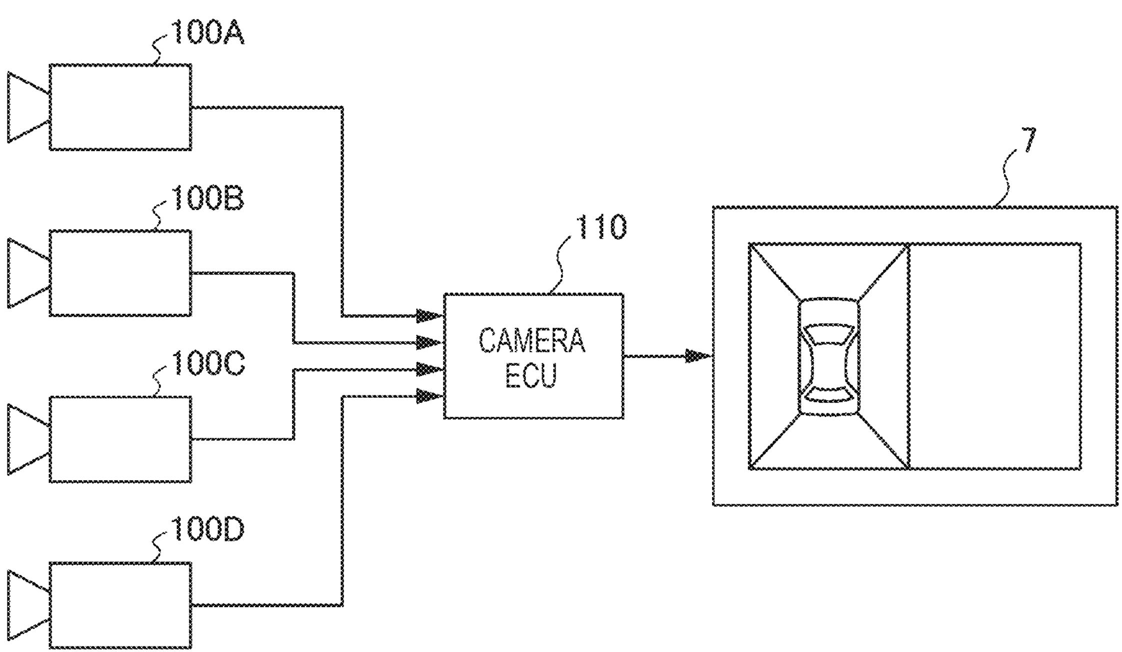
FIG. 2 is a block diagram illustrating a connection example of the vehicular cameras provided in the vehicle shown in FIG. 1, a camera ECU, and a display.

FIG. 2 is a block diagram illustrating a connection example of the vehicular cameras 100A to 100D provided in the vehicle V shown in FIG. 1, a camera ECU 110, and a display 7. The camera electronic control unit (ECU) 110 in FIG. 2 synthesizes the images captured by the vehicular cameras 100A to 100D, and displays a synthesized image on the display 7 of a navigation system disposed on an instrument panel, for example. An occupant can visually recognize the display 7 and check a situation around the vehicle V.

Figure 3:
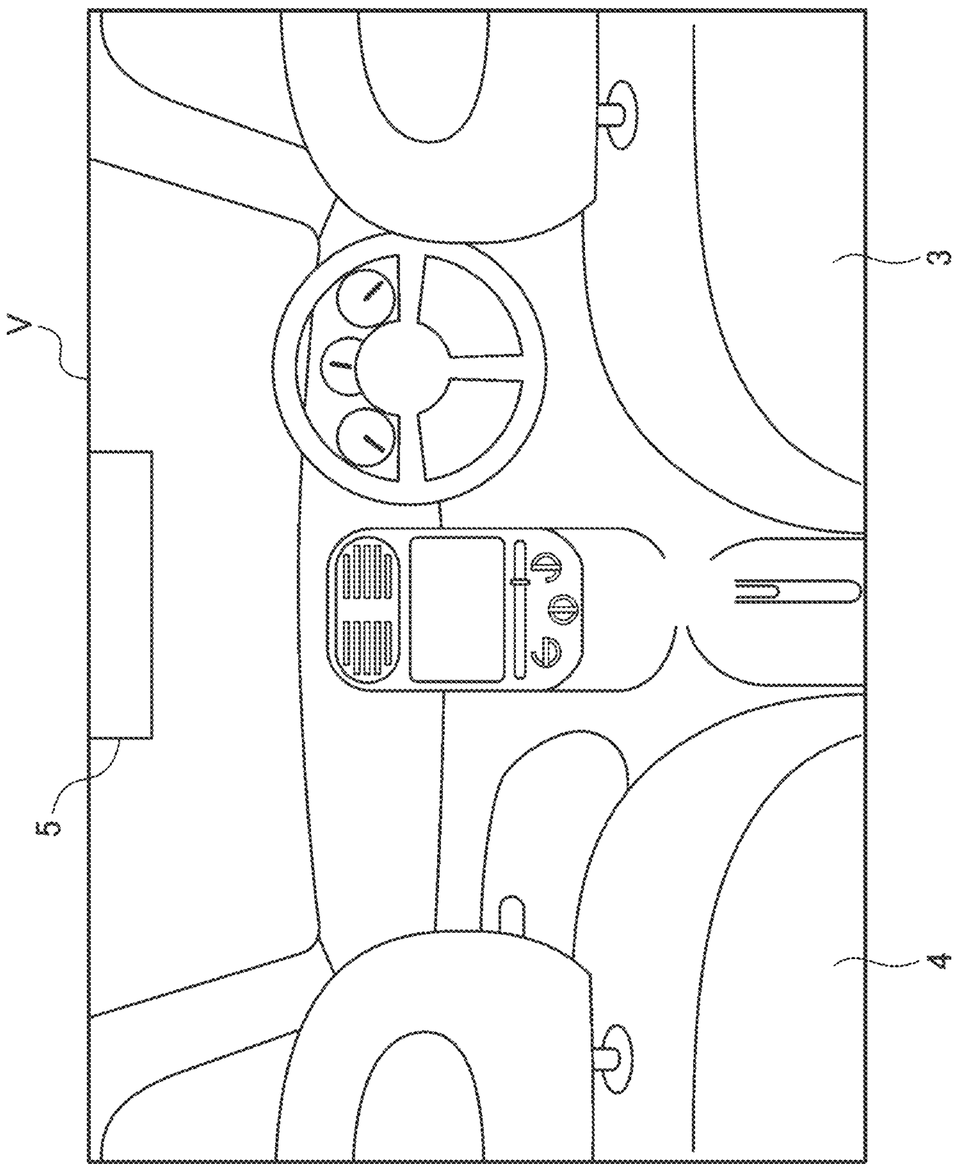
FIG. 3 is another example of the vehicle, and is a schematic diagram of a cabin of the vehicle on which a vehicular camera is mounted.
Figure 4:
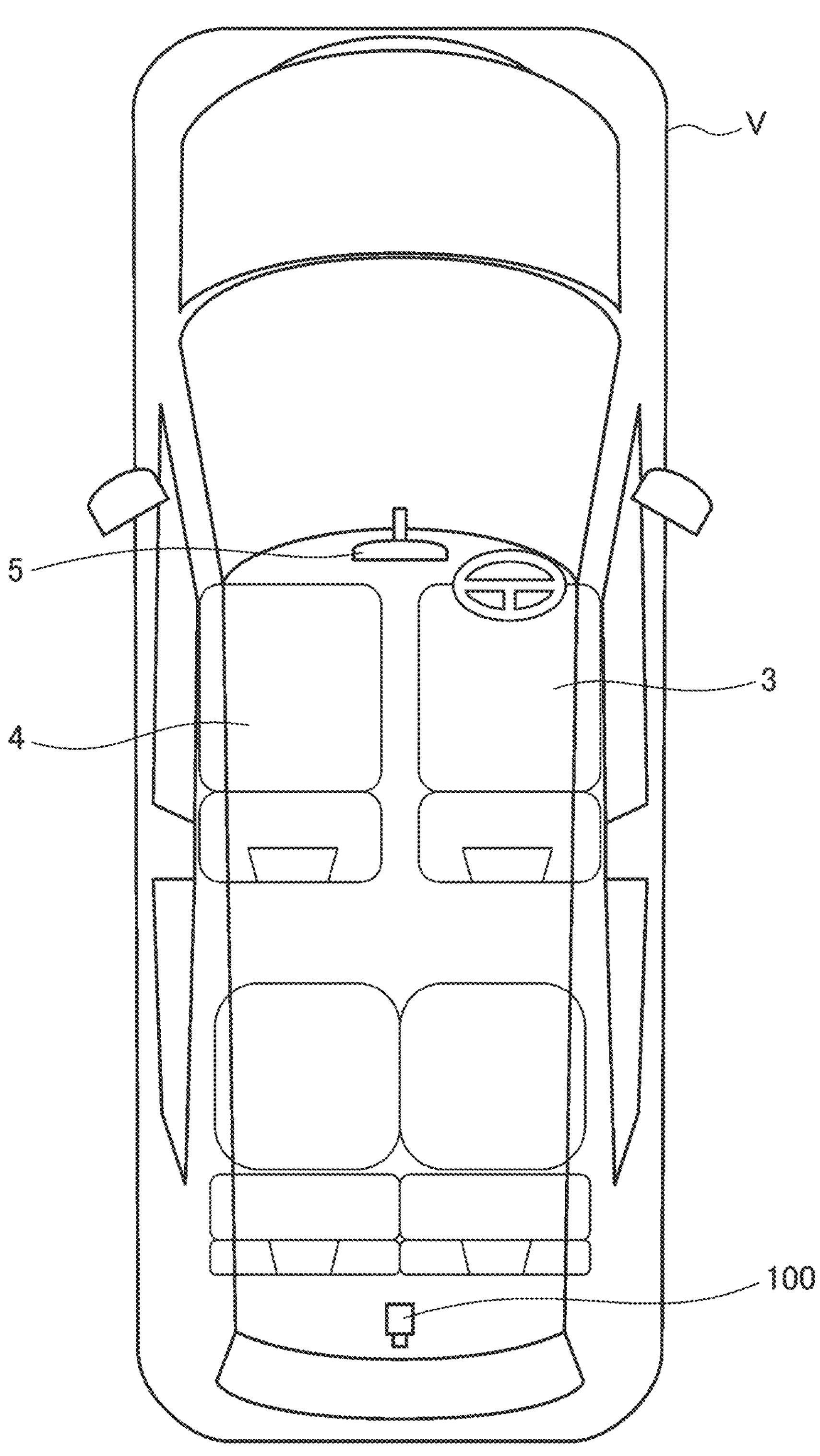
FIG. 4 is a top view of the vehicle in FIG. 3.
Figure 5:
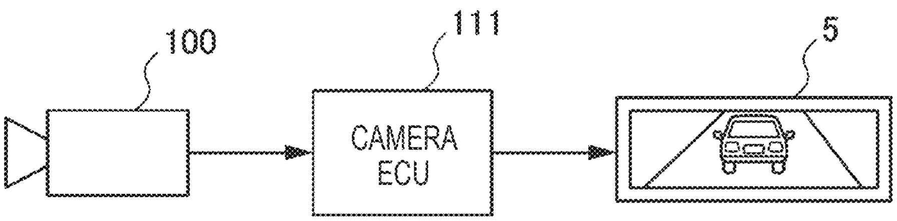
FIG. 5 is a block diagram illustrating a connection example of the vehicular camera provided in the vehicle shown in FIG. 3, a camera ECU, and a display device.

FIG. 3 is another example of the vehicle, and is a schematic diagram of a cabin of the vehicle on which the vehicular camera is mounted, and FIG. 4 is a top view of the vehicle in FIG. 3. The vehicle V includes a display device 5 (for example, an electronic rearview mirror) at an attachment position of a rearview mirror which is a front portion between a driver's seat 3 and a passenger seat 4 in a cabin 2. Further, the vehicle Vis provided with the vehicular camera 100 at a rear side of a vehicle body. FIG. 5 is a block diagram illustrating a connection example of the vehicular camera 100 provided in the vehicle V shown in FIG. 3, a camera ECU 111, and the display device 5. The camera electronic control unit (ECU) 111 in FIG. 4 processes an image captured by the vehicular camera 100, and the display device 5 displays the image. The occupant can visually recognize the display device 5 and check a rear situation of the vehicle V.

(Embodiment of Vehicular Camera)

Figure 6:
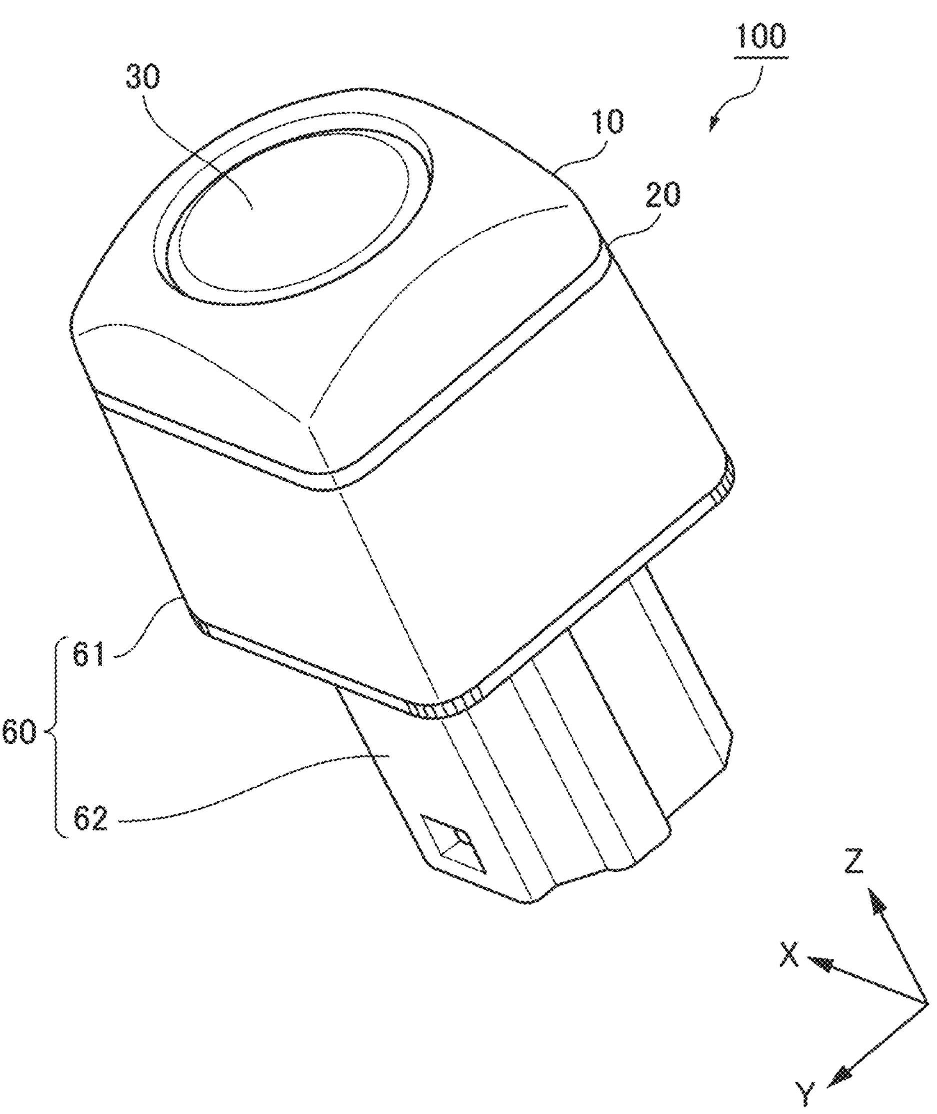
FIG. 6 is a front perspective view of the vehicular camera according to an embodiment.
Figure 7:
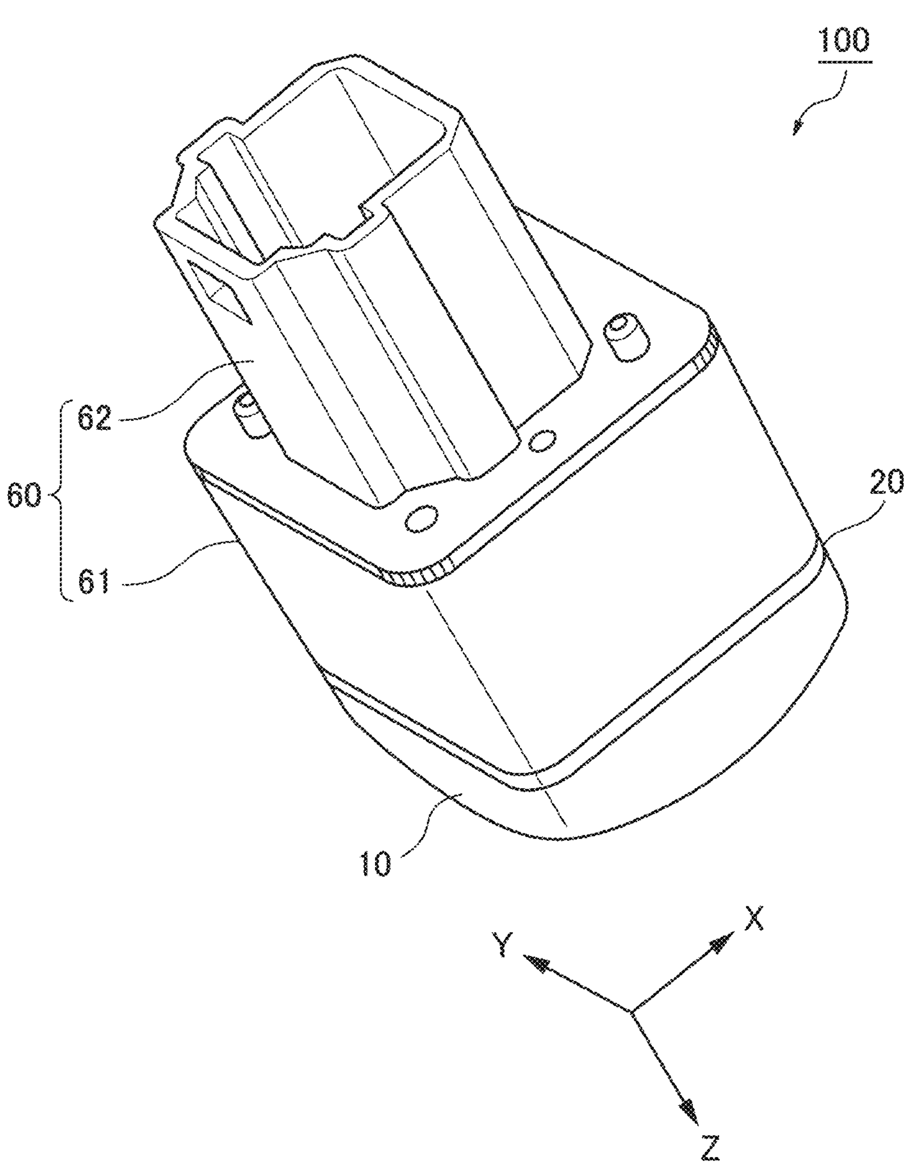
FIG. 7 is a rear perspective view of the vehicular camera according to the embodiment.
Figure 8:
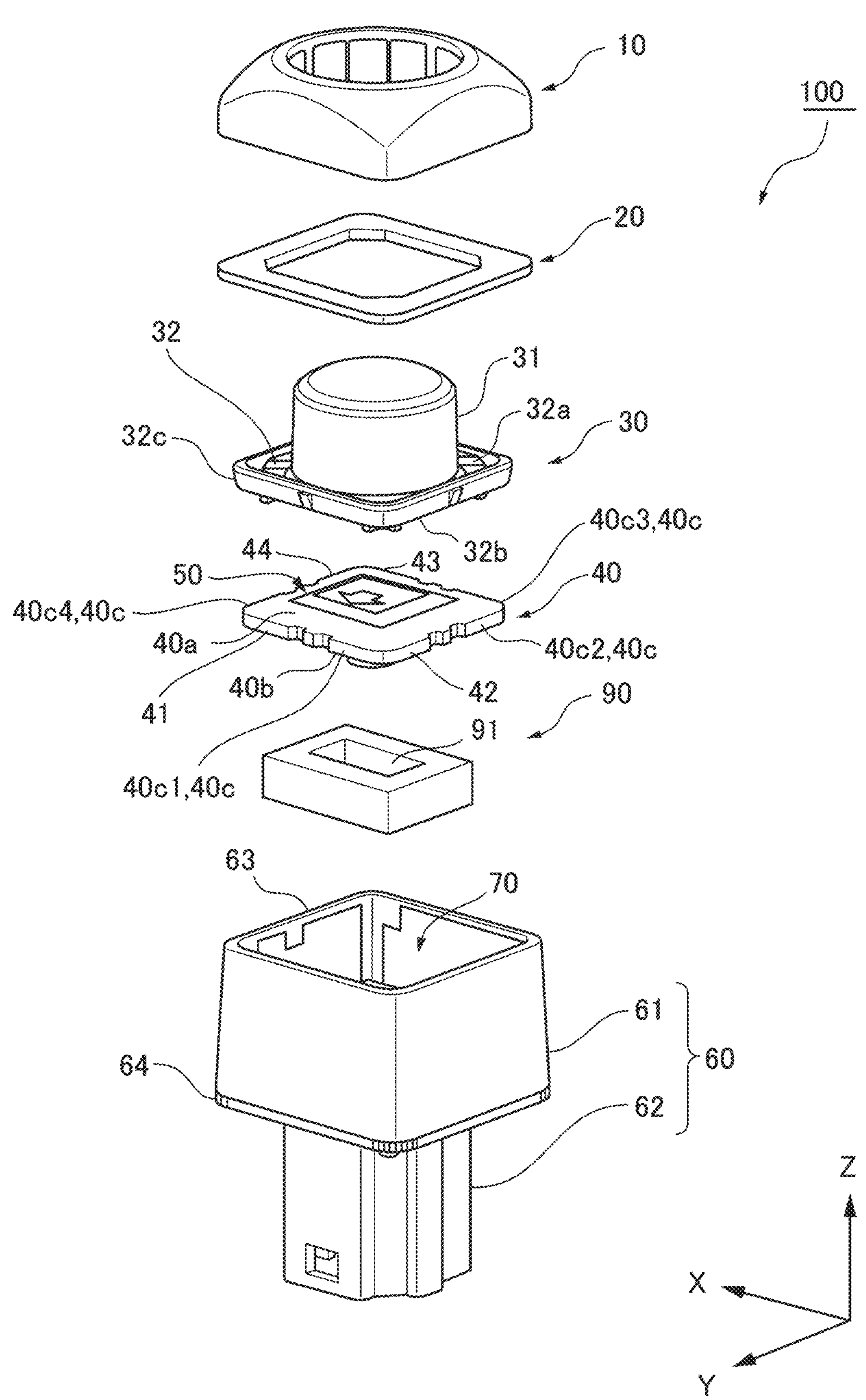
FIG. 8 is an exploded perspective view of the vehicular camera according to the embodiment.
Figure 9:
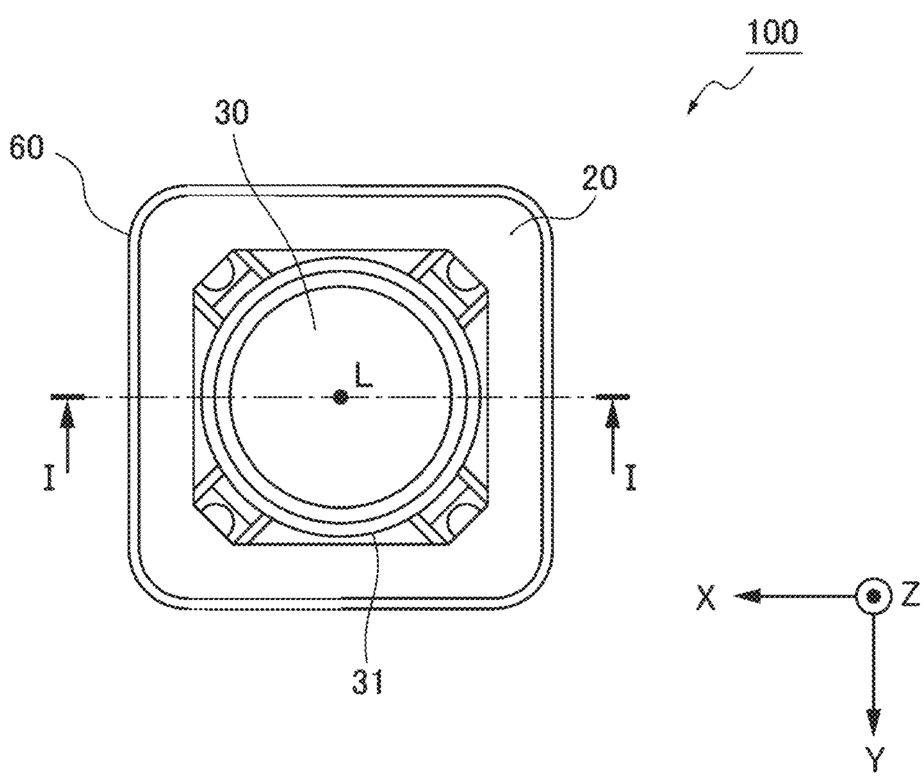
FIG. 9 is a top view of the vehicular camera according to the embodiment.
Figure 10:
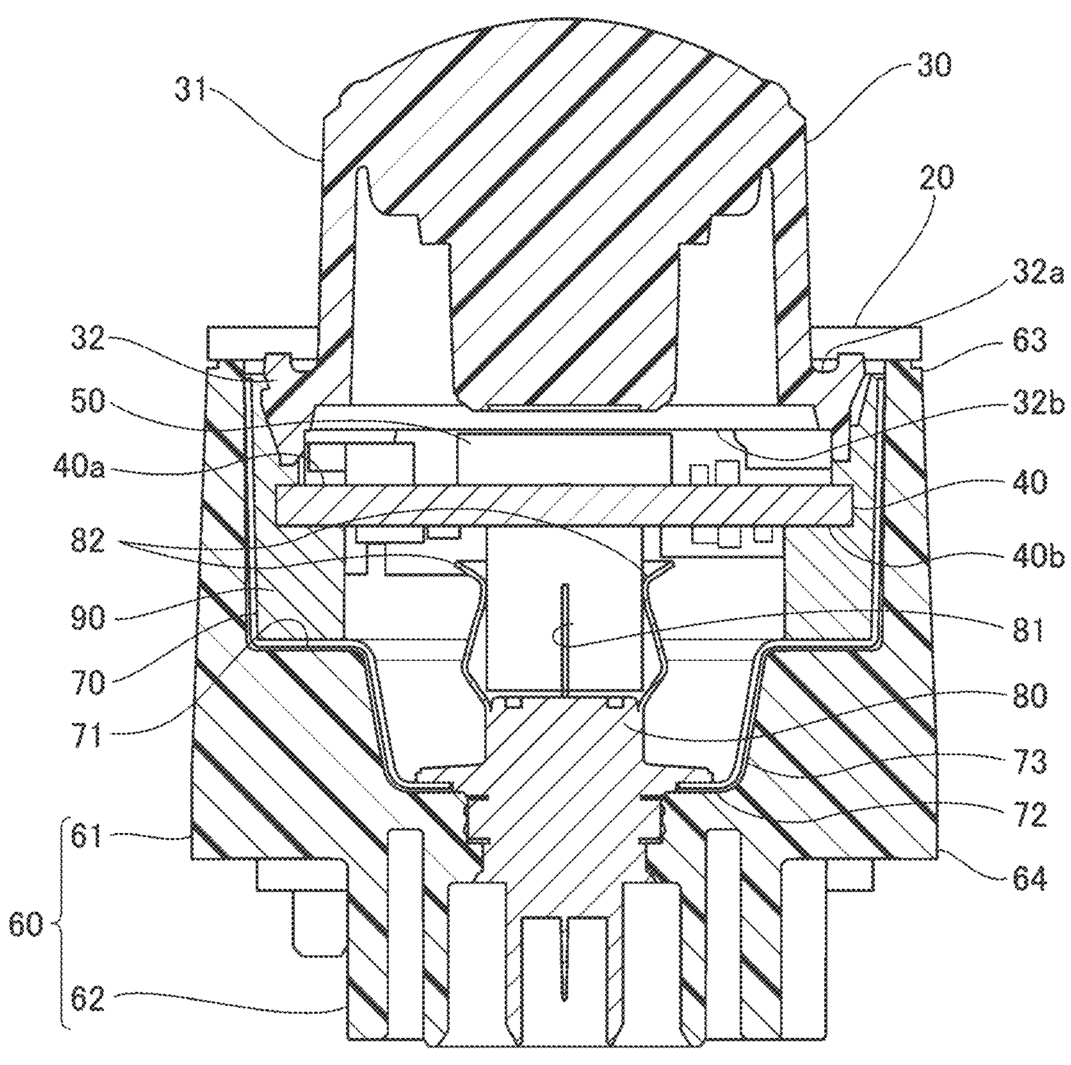
FIG. 10 is a cross-sectional view taken along a line I-I in FIG. 9.
Figure 10:
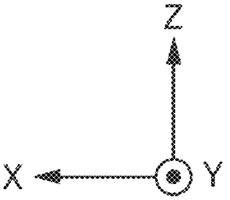

FIG. 6 is a front perspective view of the vehicular camera 100 according to an embodiment. FIG. 7 is a rear perspective view of the vehicular camera 100 according to the embodiment. FIG. 8 is an exploded perspective view of the vehicular camera 100 according to the embodiment. FIG. 9 is a top view of the vehicular camera 100 according to the embodiment. FIG. 10 is a cross-sectional view taken along a line I-I in FIG. 9. Coordinates including an X axis along one side of the vehicular camera 100, a Y axis orthogonal to the X axis and along another side of the vehicular camera 100, and a Z axis orthogonal to the X axis and the Y axis and along a height direction of the vehicular camera 100 are defined, and are used in the following description.

The vehicular camera 100 according to the present embodiment includes a cap 10, a ring member 20, a lens unit 30, a circuit board 40, an imaging element 50, a housing 60, a shield 70, and a resin member 90. The cap 10 is a member that is attached to the ring member 20 and protects the lens unit 30. In each of FIGS. 9 and 10, the cap 10 is not shown.

The ring member 20 is implemented by a rectangular annular member having a flat plate shape in a plan view, and is welded to the lens unit 30 and the housing 60 by laser welding. An inner peripheral surface of the ring member 20 faces an outer peripheral surface of a first tubular portion 31 (to be described below) that constitutes a lens barrel of the lens unit 30. An inner diameter of the ring member 20 has a length that allows the first tubular portion 31 (to be described below) of the lens unit 30 to be inserted.

The ring member 20 can be molded with a first resin. Accordingly, the ring member 20 can be easily molded at low cost.

The lens unit 30 includes a first tubular portion 31 constituting a tubular lens barrel, and at least one lens that is accommodated inside the first tubular portion 31 and arranged on an optical axis L (an axis extending in a direction perpendicular to a paper surface of FIG. 9 and along the Z axis). The first tubular portion 31 has a tubular shape, and holds therein, for example, a lens group including a plurality of lenses. The respective lenses in the lens group are arranged in a state in which respective optical axes L are aligned with each other, and constitute the lens group used for capturing images of the inside and outside of the vehicle body of the vehicle V.

Further, the lens unit 30 has a flange portion 32 disposed outside the first tubular portion 31 to extend outward with reference to the optical axis L over an entire circumference centering on the optical axis L. The flange portion 32 has a first flange surface 32*a* facing the ring member 20, a second flange surface 32*b* opposite to the first flange surface 32*a* and located in an internal space of a large-diameter tubular portion 61 of the housing 60 to be described later, and a flange end surface 32*c* connecting the first flange surface 32*a* and the second flange surface 32*b*.

At least the flange portion 32 of the lens unit 30 can be molded with a second resin. The lens unit 30 may be entirely molded with the second resin. Accordingly, the lens unit 30 can be easily molded at low cost.

The circuit board 40 is disposed in the internal space of the housing 60, and includes a first surface 40*a*, a second surface 40*b* opposite to the first surface 40*a*, and an end surface 40*c* disposed between the first surface 40*a* and the second surface 40*b*. However, two or more circuit boards may be provided.

The circuit board 40 has a first shape having at least a first side 41, a second side 42, a third side 43, and a fourth side 44 in a plan view of the circuit board 40 (a shape viewed in a direction of the optical axis L, that is, a direction along the Z axis, the same applies hereinafter). The first shape is, for example, a first quadrilateral shape. The end surface 40*c* of the circuit board 40 includes at least a first end surface 40*cl* corresponding to the first side 41, a second end surface 40*c*2 corresponding to the second side 42, a third end surface 40*c*3 corresponding to the third side 43, and a fourth end surface 40*c*4 corresponding to the fourth side 44.

The imaging element 50 is disposed on the first surface 40*a* of the circuit board 40 and on the optical axis L of at least one lens of the lens unit 30. The imaging element 50 is electrically connected to a circuit of the circuit board 40, and can capture an image by directing external light to the imaging element 50.

The housing 60 is a tubular member having the internal space, and serves to support the lens unit 30 and accommodate at least the circuit board 40 and the imaging element 50. The housing 60 has the large-diameter tubular portion 61 having a second tubular shape along the optical axis L, and a small-diameter tubular portion 62 along the optical axis L. The large-diameter tubular portion 61 constituting a second tubular portion has a larger cross-sectional area than the small-diameter tubular portion 62, and has a rectangular cross section. The large-diameter tubular portion 61 accommodates at least the circuit board 40 and the imaging element 50 therein. The small-diameter tubular portion 62 mainly accommodates a connector 80 that secures electrical connection with the outside of the vehicular camera 100 (to be described below). The large-diameter tubular portion 61 and the small-diameter tubular portion 62 may be integrally formed by a resin to be described later, and the large-diameter tubular portion 61 and the small-diameter tubular portion 62 prepared individually in advance may be joined by a method such as welding or screwing. In the present embodiment, the housing 60 has a rectangular tubular shape, but is not limited thereto, and may have a polygonal tubular shape other than the rectangular tubular shape, a circular or elliptical tubular shape, or another tubular shape.

The large-diameter tubular portion 61 has a first end 63 and a second end 64 that is opposite to the first end 63 and disposed at a position farther from the first end 63 with reference to the lens unit 30 in the direction of the optical axis L.

At least the first end 63 of the housing 60 can be molded with a third resin. The housing 60 may be entirely molded with the third resin. Accordingly, the housing 60 can be easily molded at low cost.

As illustrated in FIG. 10, the housing 60 includes a connector 80 disposed on a bottom surface facing the circuit board 40 in a manner of extending over the inside and outside of the housing 60. The connector 80 includes at least a first terminal 81 and a second terminal 82 that electrically connect the inside and the outside of the housing 60, and the first terminal 81 and the second terminal 82 are electrically connected to the circuit of the circuit board 40.

The shield 70 made of metal is disposed to surround the circuit board 40 in the internal space of the housing 60. The shield 70 serves to shield electromagnetic waves coming from the outside of the housing 60 and electromagnetic waves to be radiated in the internal space.

Figure 11:
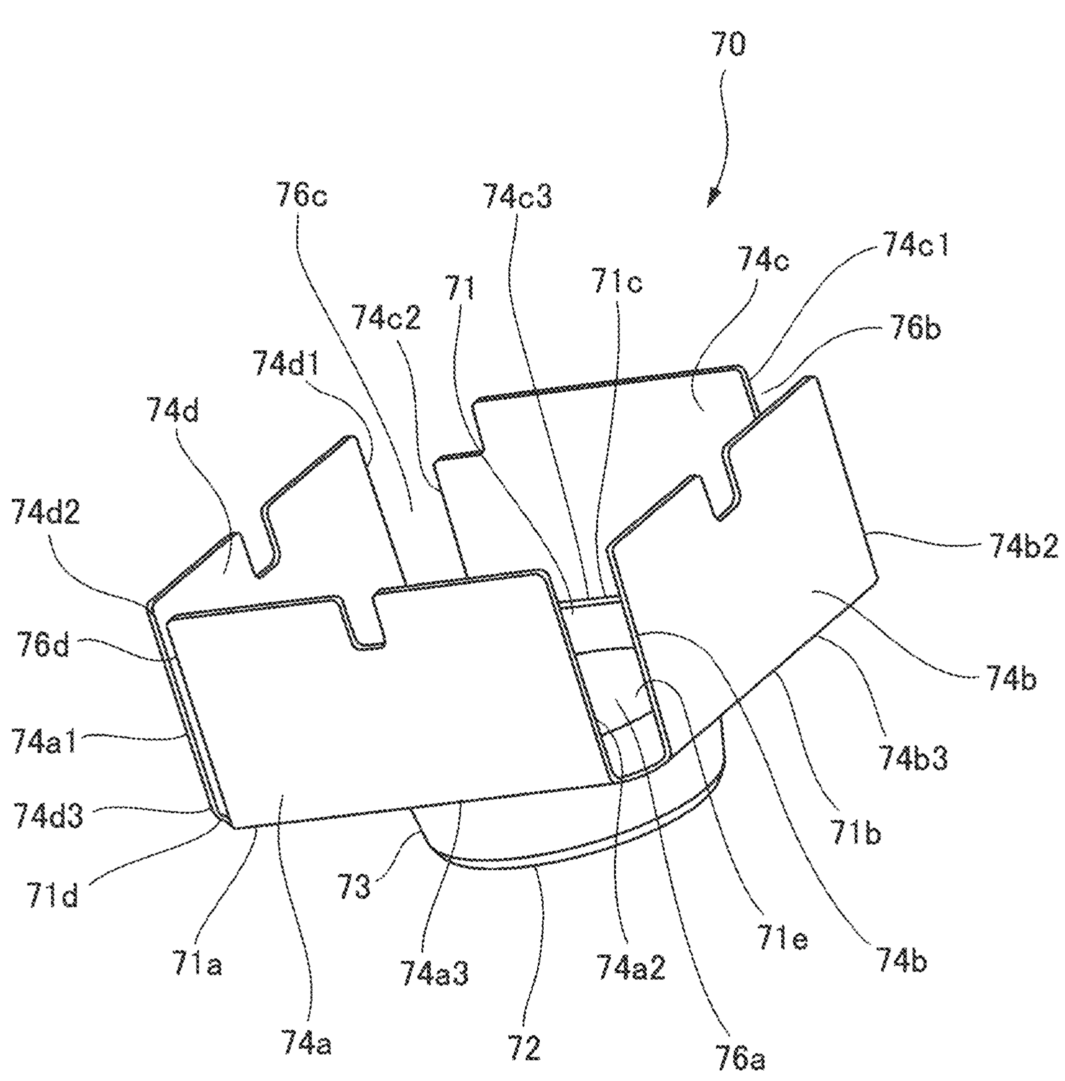
FIG. 11 is a perspective view of a shield.
Figure 11:
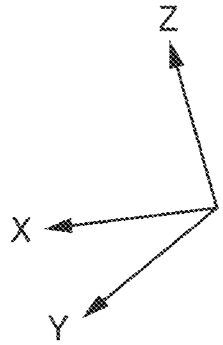

FIG. 11 is a perspective view of the shield 70. The shield 70 includes a first bottom surface portion 71, a second bottom surface portion 72, and a connection portion 73 connecting the first bottom surface portion 71 and the second bottom surface portion 72. That is, the shield 70 has a stepped bottom surface.

The first bottom surface portion 71 of the shield 70 is disposed to face the second surface 40*b* of the circuit board 40, and has a second shape having at least a fifth side 71*a*, a sixth side 71*b*, a seventh side 71*c*, and an eighth side 71*d* in a plan view of the shield 70. The second shape is, for example, a second quadrilateral shape. Further, the first bottom surface portion 71 includes a hole 71*e* disposed to include a central portion of the second shape. The hole 71 has a third shape in the plan view of the shield 70. The third shape is, for example, a circular shape.

The second bottom surface portion 72 of the shield 70 is disposed to correspond to the hole 71, which is disposed to include the central portion of the second shape of the first bottom surface portion 71, and face the second surface 40*b* of the circuit board 40, and is disposed to be separated from the first bottom surface portion 71 with reference to the second surface 40*b* of the circuit board 40. The second bottom surface portion 72 corresponds to a bottom surface of the housing 60. The connector 80 is disposed to pass through the hole 71*e* and penetrate the second bottom surface portion 72.

The connection portion 73 of the shield 70 connects an entire periphery of the hole 71 disposed to include the central portion of the second shape of the first bottom surface portion 71 and an entire periphery of the second bottom surface portion 72.

Further, the shield 70 includes a first side surface portion 74*a* disposed to correspond to the fifth side 71*a* of the first bottom surface portion 71 in a direction opposite to the second bottom surface portion 72, a second side surface portion 74*b* disposed to correspond to the sixth side 71*b* of the first bottom surface portion 71 in the direction opposite to the second bottom surface portion 72, a third side surface portion 74*c* disposed to correspond to the seventh side 71*c* of the first bottom surface portion 71 in the direction opposite to the second bottom surface portion 72, and a fourth side surface portion 74*d* disposed to correspond to the eighth side 71*d* of the first bottom surface portion 71 in the direction opposite to the second bottom surface portion 72.

At least a part of the first side surface portion 74*a* faces the first end surface 40*cl* of the circuit board 40. At least a part of the second side surface portion 74*b* faces the second end surface 40*c*2 of the circuit board 40. At least a part of the third side surface portion 74*c* faces the third end surface 40*c*3 of the circuit board 40. At least a part of the fourth side surface portion 74*d* faces the fourth end surface 40*c*4 of the circuit board 40.

As illustrated in FIG. 8, the vehicular camera 100 further includes the resin member 90. The resin member 90 is made of a resin having a predetermined thermal conductivity, such as a silicone resin, and is disposed between the circuit board 40 and the first bottom surface portion 71 of the shield 70 in a manner of extending over an entire circumference of the hole 71*e* including the central portion of the second shape of the first bottom surface portion 71. In the embodiment, the resin member 90 is a rectangular frame-shaped member surrounding the hole 71*e*, and has a through hole 91 at a center in a plan view thereof. Since the resin member 90 has a predetermined thermal conductivity, the resin member 90 dissipates heat generated from the circuit board 40 and the like to achieve a smooth operation of the vehicular camera 100. The resin member 90 contains a magnetic material, which will be described later.

In a state in which the housing 60 accommodates the circuit board 40, the imaging element 50, the shield 70, and the resin member 90, the ring member 20 is welded to the flange portion 32 of the lens unit 30 on a radially inner side, and is welded to the first end 63 of the housing 60 on a radially outer side over the entire circumference. The welding is performed by, for example, laser welding.

General laser welding is used for welding, for example, a first resin having a predetermined light transmittance and a second resin or a third resin having a light transmittance lower than the light transmittance of the first resin at a wavelength of laser light. When the first resin is irradiated with the laser light in a state in which pressure is applied to both the resins, the laser light is not absorbed and passes through the first resin. The transmitted laser light is absorbed by a surface of the second resin or the third resin having a light transmittance lower than that of the first resin. The energy of the absorbed laser is converted into heat, and the surface of the second resin or the third resin is heated. Further, a surface of the first resin in contact with the surface of the second resin or the third resin is also heated due to heat conduction. Accordingly, the first resin and the second resin or the third resin are melted at a boundary surface therebetween. When the laser emission is stopped, the melted resin is solidified and both resins are welded.

In the present embodiment, the ring member 20 is molded with the first resin, at least the flange portion 32 of the lens unit 30 is molded with the second resin, and at least the first end 63 of the housing 60 is molded with the third resin. In the laser welding, first, in a state in which the ring member 20 is pressed against the first flange surface 32*a* of the flange portion 32 of the lens unit 30, the laser is emitted to weld a lower surface of the ring member 20 and the first flange surface 32*a*. Thereafter, in a state in which the ring member 20 is pressed against the first end 63 of the housing 60, the laser is emitted to weld the lower surface of the ring member 20 and the first end 63.

The vehicular camera 100 covers the internal circuit board 40 with the shield 70 made of metal and blocks electromagnetic waves in order to ensure performance of preventing noise leakage to the inside and an influence of noise from the outside, that is, the so-called electromagnetic compatibility (EMC) performance. However, in an actual product, a space between the shield 70 and the circuit board 40 may act as a capacitor with a predetermined stray capacity. Further, even if the shield 70 is provided, due to characteristics of an internal structure of the vehicular camera 100, a portion that cannot completely cover the circuit board 40 that may be a generation source of electromagnetic waves, that is, a so-called gap is inevitably formed. As a result, the capacitor with the stray capacity induces internal noise radiation or external noise inflow through a path including such a gap, resulting in a situation in which the electromagnetic waves cannot be sufficiently shielded.

Further, in the embodiment, the resin member 90 for heat dissipation is disposed between the circuit board 40 and the first bottom surface portion 71 of the shield 70. In the above-described state, the resin member 90 causes resonance of noise, which may further adversely affect the operation of the vehicular camera 100.

Therefore, the resin member 90 of the present embodiment contains a magnetic material in addition to the resin having a thermal conductivity. The resin member 90 is in contact with the second surface 40*b* of the circuit board 40, and the first side surface portion 74*a*, the second side surface portion 74*b*, the third side surface portion 74*c*, the fourth side surface portion 74*d*, and the first bottom surface portion 71 of the shield 70. The resin member 90 can be formed, for example, by mixing a magnetic material, which is powder, with a resin as a base material.

Accordingly, the resin member 90 is in contact with the circuit board 40 and the shield 70 and blocks a gap that may be a path of electromagnetic waves, and thus radiation or inflow of noise can be effectively prevented. Since the resin member 90 itself contains the magnetic material, the resin member 90 has a function of blocking or absorbing noise. Thus, the resin member 90 can exhibit not only a heat dissipation effect but also a noise shielding effect, and high reliability of the vehicular camera 100 can be ensured.

The magnetic material of the resin member 90 may be, for example, ferrite. Accordingly, a magnetic material that is easily available at low cost can be used.

The number of pixels of the imaging element 50 may be 1 megapixel or more. For example, the imaging element 50 may be a complementary meta-oxide-semiconductor (CMOS) image sensor having the number of pixels such as 1.3 M pixels, 2 M pixels, 3 M pixels, 5 M pixels, and 8 M pixels.

Accordingly, it is possible to capture an image with high accuracy and provide an image that can be compatible with a high-speed communication standard such as a 5G communication standard. As the number of pixels of the imaging element 50 increases, a signal processing speed becomes faster and unnecessary radiation is more likely to occur. However, as in the present embodiment, by exerting the shielding action by the shield 70 and the resin member 90, it is possible to respond to a demand for reduction of unnecessary radiation at a high level in the high-speed communication standard. In addition, it is possible to obtain the imaging element 50 with high reliability by adopting the CMOS image sensor.

The resin member 90 is a gel-like member that is solid but has predetermined fluidity. Therefore, when the circuit board 40 is placed on the resin member 90 during assembly of the vehicular camera 100, the resin member 90 is deformed to expand radially outward. The resin member 90 enters a gap between the first end surface 40*cl* of the circuit board 40 and the first side surface portion 74*a* of the shield 70, a gap between the second end surface 40*c*2 of the circuit board 40 and the second side surface portion 74*b* of the shield 70, a gap between the third end surface 40*c*3 of the circuit board 40 and the third side surface portion 74*c* of the shield 70, and a gap between the fourth end surface 40*c*4 of the circuit board 40 and the fourth side surface portion 74*d* of the shield 70. As a result, as illustrated in FIG. 10, the resin member 90 may further come into contact with the first end surface 40*cl*, the second end surface 40*c*2, the third end surface 40*c*3, and the fourth end surface 40*c*4 of the circuit board 40. Accordingly, shielding performance of the resin member 90 can be improved.

As a result of the above-described deformation, at least a part of an interface of the resin member 90 may be between the first surface 40*a* and the second surface 40*b* of the circuit board 40 in the direction of the optical axis L. Accordingly, the shielding performance of the resin member 90 can be further improved. However, at least a part of the interface may be formed on the lens unit 30 side across the first surface 40*a* of the circuit board 40 in the direction of the optical axis L.

The connector 80 passes through the hole 71 of the shield 70 and penetrates the through hole 91 of the resin member 90 as well as the second bottom surface portion 72. As a result of the above-described deformation, the resin member 90 is deformed to expand radially inward, and closes the through hole 91. As a result, as illustrated in FIG. 10, the resin member 90 may be disposed on at least a part of the connector 80 in the longitudinal direction in a manner of extending over an entire circumference of the connector 80. Accordingly, the shielding performance of the resin member 90 can be further improved. When the vehicular camera 100 is disposed in the vehicle V, the first terminal 81 and the second terminal 82 of the connector 80 are electrically connected to a cable of the vehicle V. Accordingly, power supply from the vehicle V and exchange of signals with the vehicle V can be ensured.

The connector 80 is, for example, a coaxial connector, the first terminal 81 is a ground connection terminal, and the second terminal 82 is a signal terminal. Accordingly, the power supply from the vehicle V and the exchange of high-frequency signals with the vehicle V can be ensured.

As described above, the first shape of the circuit board 40 is the first quadrilateral shape, the second shape of the first bottom surface portion 71 of the shield 70 is the second quadrilateral shape, and the third shape of the hole 71 of the shield 70 is a circular shape. Accordingly, the vehicular camera 100 can be easily manufactured using a member having a common shape.

Returning to FIG. 11, the shield 70 will be further described. In the shield 70, at least the first bottom surface portion 71, the connection portion 73, and the second bottom surface portion 72 are formed by a continuous curved surface. A first shield gap portion 76*a* exists between the first side surface portion 74*a* and the second side surface portion 74*b* of the shield 70, a second shield gap portion 76*b* exists between the second side surface portion 74*b* and the third side surface portion 74*c*, a third shield gap portion 76*c* exists between the third side surface portion 74*c* and the fourth side surface portion 74*d*, and a fourth shield gap portion 76*d* exists between the fourth side surface portion 74*d* and the first side surface portion 74*a*.

Figure 12:
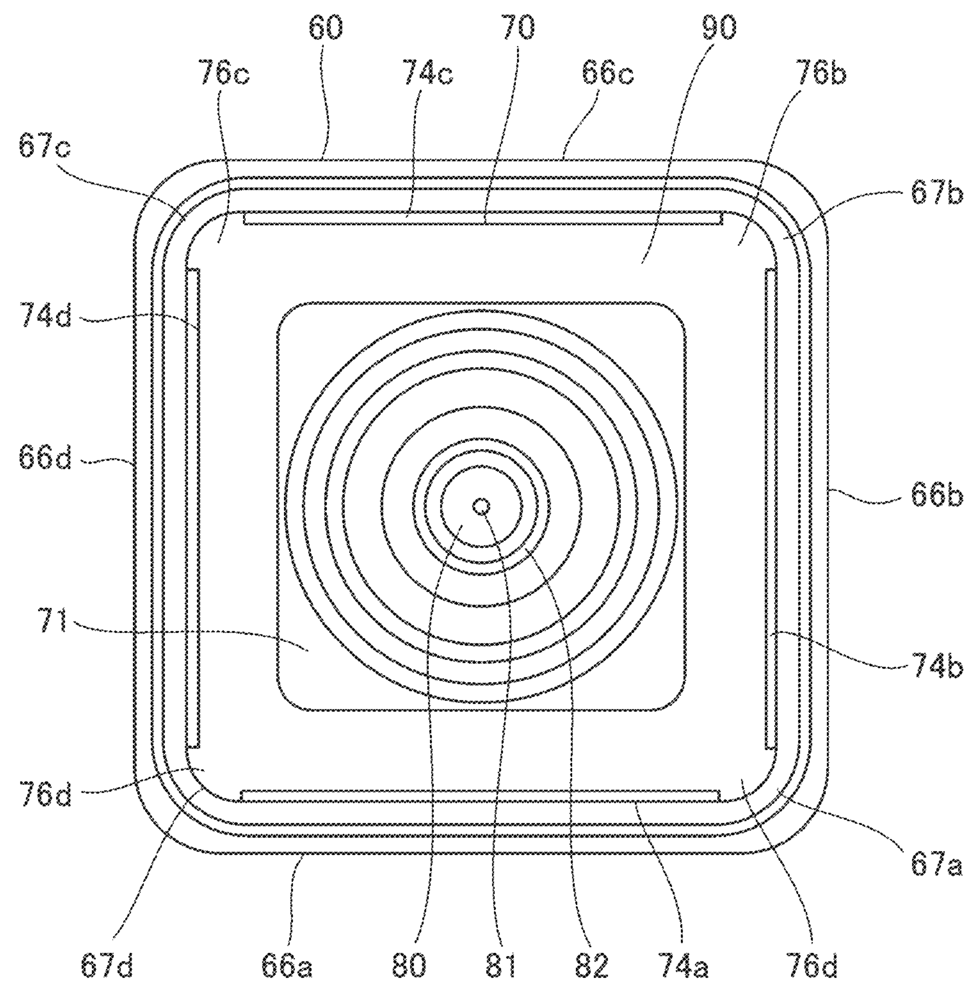
FIG. 12 is a top view of the vehicular camera in a state in which a lens unit, a circuit board, and an imaging element are removed.
Figure 12:
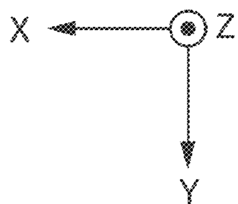
Figure 13:
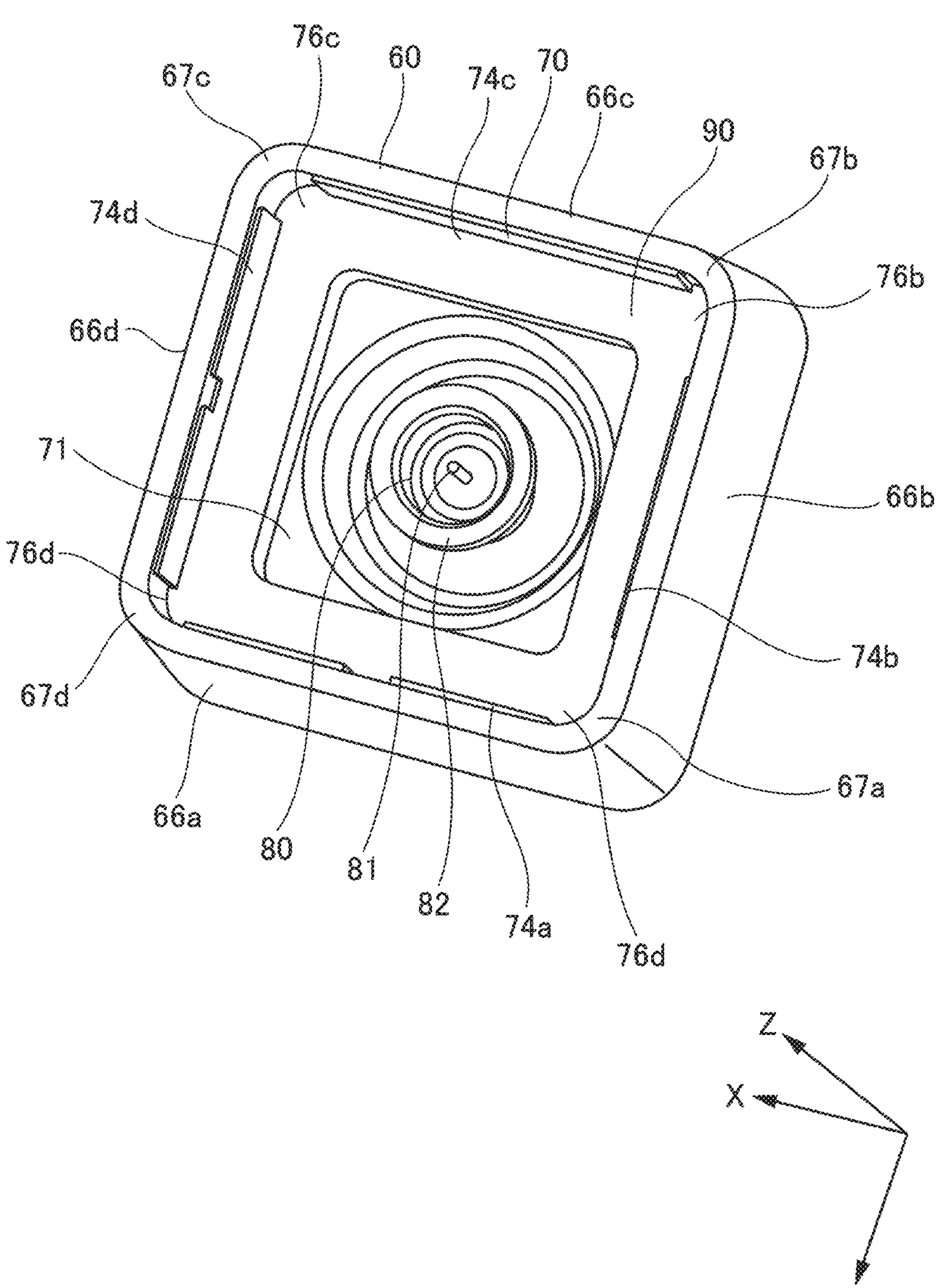
FIG. 13 is a perspective view of FIG. 12.

FIG. 12 is a top view of the vehicular camera 100 in a state in which the lens unit 30, the circuit board 40, and the imaging element 50 are removed, and FIG. 13 is a perspective view of FIG. 12. The resin member 90 is also disposed in the first shield gap portion 76*a*, the second shield gap portion 76*b*, the third shield gap portion 76*c*, and the fourth shield gap portion 76*d*.

By providing the four gap portions between the four side surface portions of the shield 70, the four side surface portions can be easily bent with respect to the first bottom surface portion 71, and the shield 70 can be easily formed. In addition, since the resin member 90 is also disposed in the four gap portions that may be paths of electromagnetic waves, the shielding performance of the resin member 90 can be improved.

The first bottom surface portion 71, the connection portion 73, and the second bottom surface portion 72 of the shield 70 can be formed by drawing a single metal plate, for example. Further, the first side surface portion 74*a*, the second side surface portion 74*b*, the third side surface portion 74*c*, and the fourth side surface portion 74*d* of the shield 70 can be formed by bending a metal plate, for example. The metal plate is first processed to have the first bottom surface portion 71, the connection portion 73, and the second bottom surface portion 72 by, for example, drawing. Thereafter, the first shield gap portion 76*a*, the second shield gap portion 76*b*, the third shield gap portion 76*c*, and the fourth shield gap portion 76*d* are formed by punching. Thereafter, the first side surface portion 74*a*, the second side surface portion 74*b*, the third side surface portion 74*c*, and the fourth side surface portion 74*d* may be formed by bending. Accordingly, the shield 70 can be easily formed at low cost.

The first side surface portion 74*a* of the shield 70 includes a first first side surface portion end surface 74*a*1, a second first side surface portion end surface 74*a*2, and a third first side surface portion end surface 74*a*3 connecting the first first side surface portion end surface 74*a*1 and the second first side surface portion end surface 74*a*2. The second side surface portion 74*b* of the shield 70 includes a first second side surface portion end surface 74*b*1, a second second side surface portion end surface 74*b*2, and a third second side surface portion end surface 74*b*3 connecting the first second side surface portion end surface 74*b*1 and the second second side surface portion end surface 74*b*2. The third side surface portion 74*c* of the shield 70 includes a first third side surface portion end surface 74*cl*, a second third side surface portion end surface 74*c*2, and a third third side surface portion end surface 74*c*3 connecting the first third side surface portion end surface 74*cl* and the second third side surface portion end surface 74*c*2. The fourth side surface portion 74*d* of the shield 70 includes a first fourth side surface portion end surface 74*d*1, a second fourth side surface portion end surface 74*d*2, and a third fourth side surface portion end surface 74*d*3 connecting the first fourth side surface portion end surface 74*d*1 and the second fourth side surface portion end surface 74*d*2.

The first shield gap portion 76*a* is located between the second first side surface portion end surface 74*a*2 of the first side surface portion 74*a* of the shield 70 and the first second side surface portion end surface 74*b*1 of the second side surface portion 74*b* of the shield 70. The second shield gap portion 76*b* is located between the second second side surface portion end surface 74*b*2 of the second side surface portion 74*b* of the shield 70 and the first third side surface portion end surface 74*cl* of the third side surface portion 74*c* of the shield 70. The third shield gap portion 76*c* is located between the second third side surface portion end surface 74*c*2 of the third side surface portion 74*c* of the shield 70 and the first fourth side surface portion end surface 74*d*1 of the fourth side surface portion 74*d* of the shield 70. The fourth shield gap portion 76*d* is located between the second fourth side surface portion end surface 74*d*2 of the fourth side surface portion 74*d* of the shield 70 and the first first side surface portion end surface 74*al* of the first side surface portion 74*a* of the shield 70.

As illustrated in FIGS. 12 and 13, the resin member 90 may pass through the first shield gap portion 76*a*, the second shield gap portion 76*b*, the third shield gap portion 76*c*, and the fourth shield gap portion 76*d* to come into contact an inner surface of the housing 60. Accordingly, it is possible to eliminate a gap, which may be a path of electromagnetic waves, between the resin member 90 and the housing 60, and it is possible to further improve the shielding performance of the resin member 90.

Specifically, the housing 60 includes a first side wall 66*a* corresponding to the first side surface portion 74*a* of the shield 70, a second side wall 66*b* formed continuously with the first side wall 66*a* and corresponding to the second side surface portion 74*b* of the shield 70, a third side wall 66*c* formed continuously with the second side wall and corresponding to the third side surface portion 74*c* of the shield 70, and a fourth side wall 66*d* formed continuously with the third side wall 66*c* and the first side wall 66*a* and corresponding to the fourth side surface portion 74*d* of the shield 70.

Further, the housing 60 includes a first housing corner 67*a* formed between the first side wall 66*a* and the second side wall 66*b*, a second housing corner 67*b* formed between the second side wall 66*b* and the third side wall 66*c*, a third housing corner 67*c* formed between the third side wall 66*c* and the fourth side wall 66*d*, and a fourth housing corner 67*d* formed between the fourth side wall 66*d* and the first side wall 66*a*.

The resin member 90 passes through the first shield gap portion 76*a* to come into contact with an inner surface of the first housing corner 67*a* of the housing 60, passes through the second shield gap portion 76*b* to come into contact with an inner surface of the second housing corner 67*b* of the housing 60, passes through the third shield gap portion 76*c* to come into contact with an inner surface of the third housing corner 67*c* of the housing 60, and passes through the fourth shield gap portion 76*d* to come into contact with an inner surface of the fourth housing corner 67*d* of the housing 60. Accordingly, it is possible to eliminate gaps, which may be paths of electromagnetic waves, between the resin member 90 and the inner surfaces of the four corners of the housing 60, and it is possible to further improve the shielding performance of the resin member 90.

Figure 14:
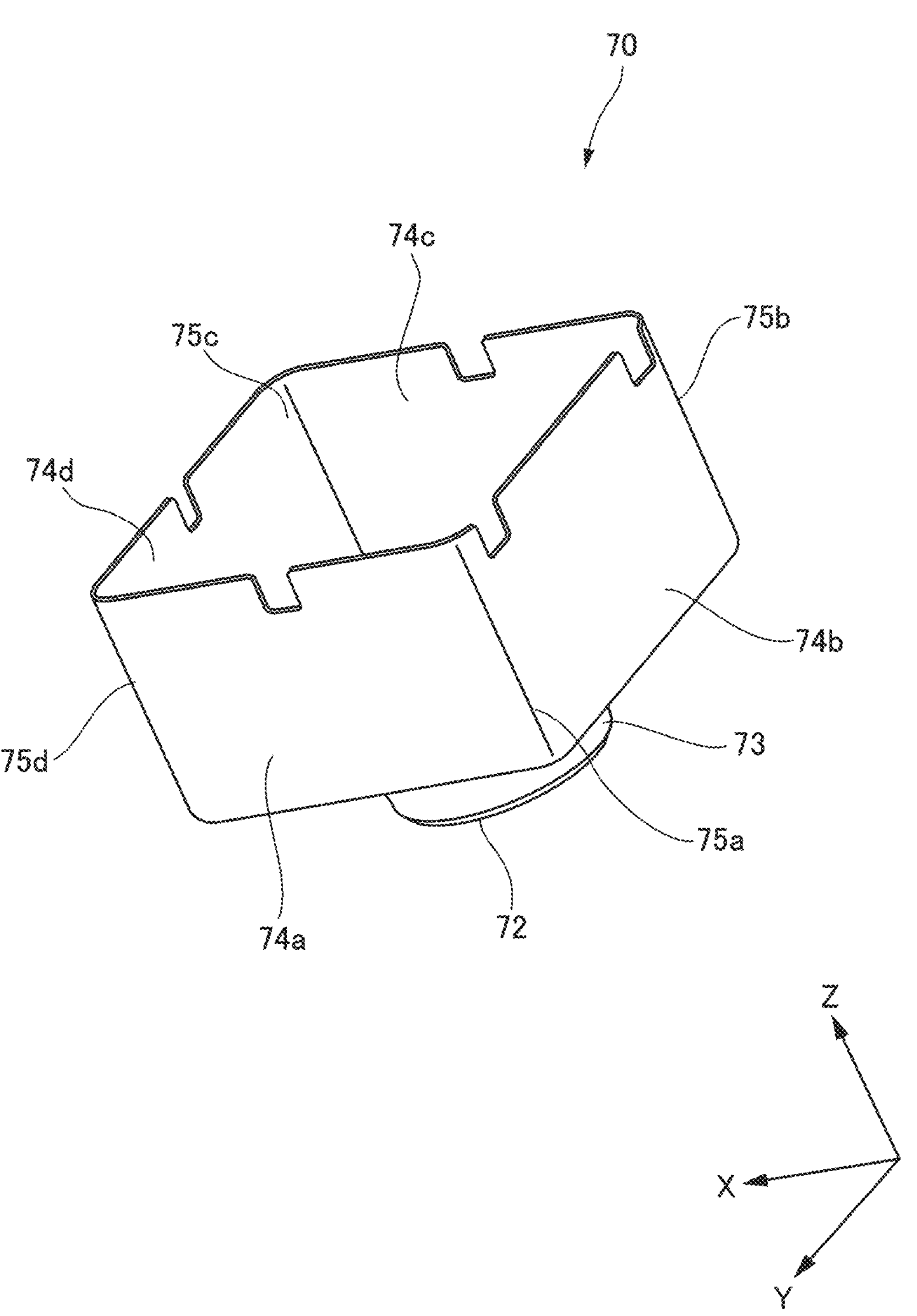
FIG. 14 is a perspective view of a shield of a modification.

FIG. 14 is a perspective view of the shield 70 according to a modification. In this example, at least the first side surface portion 74*a*, the second side surface portion 74*b*, the third side surface portion 74*c*, the fourth side surface portion 74*d*, the first bottom surface portion 71, the connection portion 73, and the second bottom surface portion 72 of the shield 70 are formed by a continuous curved surface. Accordingly, the shield 70 can be easily formed.

At least the first side surface portion 74*a*, the second side surface portion 74*b*, the third side surface portion 74*c*, the fourth side surface portion 74*d*, the first bottom surface portion 71, the connection portion 73, and the second bottom surface portion 72 of the shield 70 can be formed by drawing a single metal plate, for example. That is, the stepped bottom surface of the shield 70 can be formed by so-called two-stage drawing in which the first bottom surface portion 71 is processed after the second bottom surface portion 72 is processed. Accordingly, the shield 70 can be easily formed at low cost.

Specifically, the shield 70 includes a first shield corner 75*a* that is a curved corner connecting the first side surface portion 74*a* and the second side surface portion 74*b*, a second shield corner 75*b* that is a curved corner connecting the second side surface portion 74*b* and the third side surface portion 74*c*, a third shield corner 75*c* that is a curved corner connecting the third side surface portion 74*c* and the fourth side surface portion 74*d*, and a fourth shield corner 75*d* that is a curved corner connecting the fourth side surface portion 74*d* and the first side surface portion 74*a*. When the shield 70 of this example is used, the resin member 90 may further come into contact with an inner surface of the first shield corner 75*a*, an inner surface of the second shield corner 75*b*, an inner surface of the third shield corner 75*c*, and an inner surface of the fourth shield corner 75*d*. Accordingly, it is possible to eliminate gaps, which may be paths of electromagnetic waves, between the resin member 90 and the four corners of the shield 70, and it is possible to improve the shielding performance of the resin member 90.

FIG. 15 is a graph illustrating an intensity of noise leaking from the vehicular camera 100 to an outside. A horizontal axis corresponds to a frequency [Hz] of noise, and a vertical axis corresponds to an intensity frequency [dB] of noise. A solid line corresponds to a graph of the vehicular camera 100 according to the embodiment in which a resin material containing a magnetic material is used, and a broken line corresponds to a graph of the vehicular camera in the related art in which a resin material containing no magnetic material is used. In the vehicular camera 100 according to the embodiment, noise is reduced as compared with the vehicular camera in the related art, and effectiveness of the resin material containing a magnetic material is exhibited.

From the above, at least the following matters are described in the present disclosure Components corresponding to those in the embodiment are shown in parentheses, but the present disclosure is not limited thereto.

(1) A vehicular camera (vehicular camera 100), including:

a lens unit (lens unit 30) including at least one lens;

a circuit board (circuit board 40) having a first surface (first surface 40*a*), a second surface (second surface 40*b*) opposite to the first surface, and an end surface (end surface 40*c*) disposed between the first surface and the second surface;

an imaging element (imaging element 50) electrically connected to a circuit of the circuit board and disposed on an optical axis of the at least one lens;

a housing (housing 60) configured to support the lens unit and accommodate at least the circuit board and the imaging element; and a shield (shield 70) made of metal that is disposed in an internal space of the housing to surround the circuit board, in which the circuit board has a first shape that includes at least a first side (first side 41), a second side (second side 42), a third side (third side 43), and a fourth side (fourth side 44) in a plan view of the circuit board, the end surface of the circuit board includes at least a first end surface (first end surface 40*c*1) corresponding to the first side, a second end surface (second end surface 40*c*2) corresponding to the second side, a third end surface (third end surface 40*c*3) corresponding to the third side, and a fourth end surface (fourth end surface 40*c*4) corresponding to the fourth side, the housing includes a connector (connector 80) disposed on a bottom surface facing the circuit board in a manner of extending over an inside and an outside of the housing, the connector includes at least a first terminal (first terminal 81) and a second terminal (second terminal 82) that electrically connect the inside and the outside of the housing, and the first terminal and the second terminal of the connector are electrically connected to the circuit of the circuit board, the shield includes a first bottom surface portion (first bottom surface portion 71) that is disposed to face the second surface of the circuit board, has a second shape including at least a fifth side (fifth side 71*a*), a sixth side (sixth side 71*b*), a seventh side (seventh side 71*c*), and an eighth side (eighth side 71*d*) in a plan view of the shield, and includes a hole (hole 71*e*) disposed to include a central portion of the second shape, a second bottom surface portion (second bottom surface portion 72) that is disposed to correspond to the hole disposed to include the central portion of the second shape of the first bottom surface portion, face the second surface of the circuit board, and is disposed to be separated from the first bottom surface portion with reference to the second surface of the circuit board, a first side surface portion (first side surface portion 74*a*) disposed to correspond to the fifth side of the first bottom surface portion in a direction opposite to the second bottom surface portion, a second side surface portion (second side surface portion 74*b*) disposed to correspond to the sixth side of the first bottom surface portion in the direction opposite to the second bottom surface portion, a third side surface portion (third side surface portion 74*c*) disposed to correspond to the seventh side of the first bottom surface portion in the direction opposite to the second bottom surface portion, a fourth side surface portion (fourth side surface portion 74*d*) disposed to correspond to the eighth side of the first bottom surface portion in the direction opposite to the second bottom surface portion, and a connection portion (connection portion 73) configured to connect an entire periphery of the hole disposed to include the central portion of the second shape of the first bottom surface portion and an entire periphery of the second bottom surface portion, the second bottom surface portion of the shield corresponds to the bottom surface of the housing, the connector is disposed to penetrate the second bottom surface portion of the shield, at least a part of the first side surface portion of the shield faces the first end surface of the circuit board, at least a part of the second side surface portion of the shield faces the second end surface of the circuit board, at least a part of the third side surface portion of the shield faces the third end surface of the circuit board, at least a part of the fourth side surface portion of the shield faces the fourth end surface of the circuit board, the hole disposed to include the central portion of the second shape of the first bottom surface portion of the shield has a third shape in the plan view of the shield, the vehicular camera further includes a resin member (resin member 90) that contains a magnetic material, has a predetermined thermal conductivity, and is disposed between the circuit board and the first bottom surface portion of the shield in a manner of extending over an entire circumference of the hole including the central portion of the second shape of the first bottom surface portion of the shield, and the resin member is in contact with the second surface of the circuit board, the first side surface portion of the shield, the second side surface portion of the shield, the third side surface portion of the shield, the fourth side surface portion of the shield, and the first bottom surface portion of the shield.

Accordingly, the resin member is in contact with the circuit board and the shield and blocks a gap that may be a path of electromagnetic waves, and thus radiation or inflow of noise can be effectively prevented. Since the resin member itself contains the magnetic material, the resin member has a function of blocking or absorbing noise. Thus, the resin member can exhibit not only a heat dissipation effect but also a noise shielding effect, and high reliability of the vehicular camera can be ensured.

(2) The vehicular camera according to (1), in which at least the first side surface portion, the second side surface portion, the third side surface portion, the fourth side surface portion, the first bottom surface portion, the connection portion, and the second bottom surface portion of the shield are formed by a continuous curved surface.

Accordingly, the shield can be easily formed.

(3) The vehicular camera according to (2), in which at least the first side surface portion, the second side surface portion, the third side surface portion, the fourth side surface portion, the first bottom surface portion, the connection portion, and the second bottom surface portion of the shield can be formed by drawing a single metal plate.

Accordingly, the shield can be easily formed at low cost.

(4) The vehicular camera according to (2), in which the shield includes a first shield corner (first shield corner 75*a*) that is a curved corner connecting the first side surface portion and the second side surface portion of the shield, a second shield corner (second shield corner 75*b*) that is a curved corner connecting the second side surface portion and the third side surface portion of the shield, a third shield corner (third shield corner 75*c*) that is a curved corner connecting the third side surface portion and the fourth side surface portion of the shield, and a fourth shield corner (fourth shield corner 75*d*) that is a curved corner connecting the fourth side surface portion and the first side surface portion of the shield, and the resin member further comes into contact with an inner surface of the first shield corner, an inner surface of the second shield corner, an inner surface of the third shield corner, and an inner surface of the fourth shield corner.

Accordingly, shielding performance of the resin member can be improved.

(5) The vehicular camera according to (1), in which at least the first bottom surface portion, the connection portion, and the second bottom surface portion of the shield are formed by a continuous curved surface, a first shield gap portion (first shield gap portion 76*a*) exists between the first side surface portion and the second side surface portion of the shield, a second shield gap portion (second shield gap portion 76*b*) exists between the second side surface portion and the third side surface portion of the shield, a third shield gap portion (third shield gap portion 76*c*) exists between the third side surface portion and the fourth side surface portion of the shield, a fourth shield gap portion (fourth shield gap portion 76*d*) exists between the fourth side surface portion and the first side surface portion of the shield, and the resin member is disposed in the first shield gap portion, the second shield gap portion, the third shield gap portion, and the fourth shield gap portion.

Accordingly, the shield can be easily formed, and the shielding performance of the resin member can be improved.

(6) The vehicular camera according to (5), in which the first bottom surface portion, the connection portion, and the second bottom surface portion of the shield are formed by drawing a single metal plate, and the first side surface portion, the second side surface portion, the third side surface portion, and the fourth side surface portion of the shield are formed by bending the metal plate.

Accordingly, the shield can be easily formed at low cost.

(7) The vehicular camera according to (5), in which the resin member passes through the first shield gap portion, the second shield gap portion, the third shield gap portion, and the fourth shield gap portion to come into contact with an inner surface of the housing.

Accordingly, the shielding performance of the resin member can be further improved.

(8) The vehicular camera according to (5), in which the housing includes a first side wall (first side wall 66*a*) corresponding to the first side surface portion of the shield, a second side wall (second side wall 66*b*) formed continuously with the first side wall and corresponding to the second side surface portion of the shield, a third side wall (third side wall 66*c*) formed continuously with the second side wall and corresponding to the third side surface portion of the shield, a fourth side wall (fourth side wall 66*d*) formed continuously with the third side wall and the first side wall and corresponding to the fourth side surface portion of the shield, a first housing corner (first housing corner 67*a*) formed between the first side wall and the second side wall of the housing, a second housing corner (second housing corner 67*b*) formed between the second side wall and the third side wall of the housing, a third housing corner (third housing corner 67*c*) formed between the third side wall and the fourth side wall of the housing, and a fourth housing corner (fourth housing corner 67*d*) formed between the fourth side wall and the first side wall of the housing, and the resin member passes through the first shield gap portion to come into contact with an inner surface of the first housing corner of the housing, passes through the second shield gap portion to come into contact with an inner surface of the second housing corner of the housing, passes through the third shield gap portion to come into contact with an inner surface of the third housing corner of the housing, and passes through the fourth shield gap portion to come into contact with an inner surface of the fourth housing corner of the housing.

Accordingly, the shielding performance of the resin member can be further improved.

(9) The vehicular camera according to (1), in which the resin member further comes into contact with the first end surface of the circuit board, the second end surface of the circuit board, the third end surface of the circuit board, and the fourth end surface of the circuit board.

Accordingly, shielding performance of the resin member can be improved.

(10) The vehicular camera according to (9), in which at least a part of an interface of the resin member is located between the first surface of the circuit board and the second surface of the circuit board in a direction of the optical axis.

Accordingly, the shielding performance of the resin member can be further improved.

(11) The vehicular camera according to (1), in which the resin member is disposed on at least a part of the connector in a longitudinal direction in a manner of extending over an entire circumference of the connector.

Accordingly, the shielding performance of the resin member can be further improved.

(12) The vehicular camera according to (11), in which in a case where the vehicular camera is disposed in a vehicle, the first terminal and the second terminal of the connector are electrically connected to a cable of the vehicle.

Accordingly, power supply from the vehicle and exchange of signals with the vehicle can be ensured.

(13) The vehicular camera according to (12), in which the connector is a coaxial connector, the first terminal of the connector is a ground connection terminal, and the second terminal of the connector is a signal terminal.

Accordingly, the power supply from the vehicle and the exchange of high-frequency signals with the vehicle can be ensured.

(14) The vehicular camera according to (1), in which the first shape of the circuit board is a first quadrilateral shape, the second shape of the first bottom surface portion of the shield is a second quadrilateral shape, and the third shape of the hole of the shield is a circular shape.

Accordingly, the vehicular camera can be easily manufactured using a member having a common shape.

(15) The vehicular camera according to (1), in which the magnetic material of the resin member is ferrite.

Accordingly, a magnetic material that is easily available at low cost can be used.

(16) The vehicular camera according to (1), in which the housing is molded with a resin.

Accordingly, the housing can be easily molded at low cost.

(17) The vehicular camera according to (1), in which the lens unit is molded with a resin.

Accordingly, the lens unit can be easily molded at low cost.

(18) The vehicular camera according to (1), in which the lens unit includes a first tubular portion (first tubular portion 31) configured to accommodate the lens, and a flange portion (flange portion 32) disposed outside the first tubular portion to extend outward with reference to the optical axis over an entire circumference centering on the optical axis, the flange portion includes a first flange surface (first flange surface 32*a*), and a second flange surface (second flange surface 32*b*) opposite to the first flange surface, and the housing includes a first end (first end 63), and a second end (second end 64) that is opposite to the first end and disposed at a position farther than the first end with reference to the lens unit.

Accordingly, the lens unit can be easily attached to the housing.

(19) The vehicular camera according to (1), in which the number of pixels of the imaging element is 1 megapixel or more.

Accordingly, it is possible to capture an image with high accuracy and provide an image that can be compatible with a high-speed communication standard such as a 5G communication standard.

(20) The vehicular camera according to (19), in which the imaging element is a CMOS image sensor.

Accordingly, it is possible to obtain the imaging element with high reliability.

Although the embodiments have been described above with reference to the accompanying drawings, the present disclosure is not limited thereto. It is apparent to those skilled in the art that various modifications, corrections, substitutions, additions, deletions, and equivalents can be conceived within the scope described in the claims, and it is understood that such modifications, corrections, substitutions, additions, deletions, and equivalents also fall within the technical scope of the present disclosure. In addition, constituent elements in the embodiment described above may be freely combined without departing from the gist of the invention.

INDUSTRIAL APPLICABILITY

The present disclosure is useful as a vehicular camera capable of exhibiting excellent shielding performance.

What is claimed is:

1. A vehicular camera comprising:

a lens unit including at least one lens;

a circuit board having a first surface, a second surface opposite to the first surface, and an end surface disposed between the first surface and the second surface;

an imaging element electrically connected to a circuit of the circuit board and disposed on an optical axis of the at least one lens;

a housing configured to support the lens unit and accommodate at least the circuit board and the imaging element; and a shield made of metal that is disposed in an internal space of the housing to surround the circuit board, wherein the circuit board has a first shape that includes at least a first side, a second side, a third side, and a fourth side in a plan view of the circuit board, the end surface of the circuit board includes at least a first end surface corresponding to the first side, a second end surface corresponding to the second side, a third end surface corresponding to the third side, and a fourth end surface corresponding to the fourth side, the housing includes a connector disposed on a bottom surface facing the circuit board in a manner of extending over an inside and an outside of the housing, the connector includes at least a first terminal and a second terminal that electrically connect the inside and the outside of the housing, and the first terminal and the second terminal of the connector are electrically connected to the circuit of the circuit board, the shield includes a first bottom surface portion that is disposed to face the second surface of the circuit board, has a second shape including at least a fifth side, a sixth side, a seventh side, and an eighth side in a plan view of the shield, and includes a hole disposed to include a central portion of the second shape, a second bottom surface portion that is disposed to correspond to the hole disposed to include the central portion of the second shape of the first bottom surface portion, face the second surface of the circuit board, and is disposed to be separated from the first bottom surface portion with reference to the second surface of the circuit board, a first side surface portion disposed to correspond to the fifth side of the first bottom surface portion in a direction opposite to the second bottom surface portion, a second side surface portion disposed to correspond to the sixth side of the first bottom surface portion in the direction opposite to the second bottom surface portion, a third side surface portion disposed to correspond to the seventh side of the first bottom surface portion in the direction opposite to the second bottom surface portion, a fourth side surface portion disposed to correspond to the eighth side of the first bottom surface portion in the direction opposite to the second bottom surface portion, and a connection portion configured to connect an entire periphery of the hole disposed to include the central portion of the second shape of the first bottom surface portion and an entire periphery of the second bottom surface portion, the second bottom surface portion of the shield corresponds to the bottom surface of the housing, the connector is disposed to penetrate the second bottom surface portion of the shield, at least a part of the first side surface portion of the shield faces the first end surface of the circuit board, at least a part of the second side surface portion of the shield faces the second end surface of the circuit board, at least a part of the third side surface portion of the shield faces the third end surface of the circuit board, at least a part of the fourth side surface portion of the shield faces the fourth end surface of the circuit board, the hole disposed to include the central portion of the second shape of the first bottom surface portion of the shield has a third shape in the plan view of the shield, the vehicular camera further comprises a resin member that contains a magnetic material, has a predetermined thermal conductivity, and is disposed between the circuit board and the first bottom surface portion of the shield in a manner of extending over an entire circumference of the hole including the central portion of the second shape of the first bottom surface portion of the shield, and the resin member is in contact with the second surface of the circuit board, the first side surface portion of the shield, the second side surface portion of the shield, the third side surface portion of the shield, the fourth side surface portion of the shield, and the first bottom surface portion of the shield.

2. The vehicular camera according to claim 1, wherein at least the first side surface portion, the second side surface portion, the third side surface portion, the fourth side surface portion, the first bottom surface portion, the connection portion, and the second bottom surface portion of the shield are formed by a continuous curved surface.

3. The vehicular camera according to claim 2, wherein at least the first side surface portion, the second side surface portion, the third side surface portion, the fourth side surface portion, the first bottom surface portion, the connection portion, and the second bottom surface portion of the shield can be formed by drawing a single metal plate.

4. The vehicular camera according to claim 2, wherein the shield includes a first shield corner that is a curved corner connecting the first side surface portion and the second side surface portion of the shield, a second shield corner that is a curved corner connecting the second side surface portion and the third side surface portion of the shield, a third shield corner that is a curved corner connecting the third side surface portion and the fourth side surface portion of the shield, and a fourth shield corner that is a curved corner connecting the fourth side surface portion and the first side surface portion of the shield, and the resin member further comes into contact with an inner surface of the first shield corner, an inner surface of the second shield corner, an inner surface of the third shield corner, and an inner surface of the fourth shield corner.

5. The vehicular camera according to claim 1, wherein at least the first bottom surface portion, the connection portion, and the second bottom surface portion of the shield are formed by a continuous curved surface, a first shield gap portion exists between the first side surface portion and the second side surface portion of the shield, a second shield gap portion exists between the second side surface portion and the third side surface portion of the shield, a third shield gap portion exists between the third side surface portion and the fourth side surface portion of the shield, a fourth shield gap portion exists between the fourth side surface portion and the first side surface portion of the shield, and the resin member is disposed in the first shield gap portion, the second shield gap portion, the third shield gap portion, and the fourth shield gap portion.

6. The vehicular camera according to claim 5, wherein the first bottom surface portion, the connection portion, and the second bottom surface portion of the shield are formed by drawing a single metal plate, and the first side surface portion, the second side surface portion, the third side surface portion, and the fourth side surface portion of the shield are formed by bending the metal plate.

7. The vehicular camera according to claim 5, wherein the resin member passes through the first shield gap portion, the second shield gap portion, the third shield gap portion, and the fourth shield gap portion to come into contact with an inner surface of the housing.

8. The vehicular camera according to claim 5, wherein the housing includes a first side wall corresponding to the first side surface portion of the shield, a second side wall formed continuously with the first side wall and corresponding to the second side surface portion of the shield, a third side wall formed continuously with the second side wall and corresponding to the third side surface portion of the shield, a fourth side wall formed continuously with the third side wall and the first side wall and corresponding to the fourth side surface portion of the shield, a first housing corner formed between the first side wall and the second side wall of the housing, a second housing corner formed between the second side wall and the third side wall of the housing, a third housing corner formed between the third side wall and the fourth side wall of the housing, and a fourth housing corner formed between the fourth side wall and the first side wall of the housing, and the resin member passes through the first shield gap portion to come into contact with an inner surface of the first housing corner of the housing, passes through the second shield gap portion to come into contact with an inner surface of the second housing corner of the housing, passes through the third shield gap portion to come into contact with an inner surface of the third housing corner of the housing, and passes through the fourth shield gap portion to come into contact with an inner surface of the fourth housing corner of the housing.

9. The vehicular camera according to claim 1, wherein the resin member further comes into contact with the first end surface of the circuit board, the second end surface of the circuit board, the third end surface of the circuit board, and the fourth end surface of the circuit board.

10. The vehicular camera according to claim 9, wherein at least a part of an interface of the resin member is located between the first surface of the circuit board and the second surface of the circuit board in a direction of the optical axis.

11. The vehicular camera according to claim 1, wherein the resin member is disposed on at least a part of the connector in a longitudinal direction in a manner of extending over an entire circumference of the connector.

12. The vehicular camera according to claim 11, wherein in a case where the vehicular camera is disposed in a vehicle, the first terminal and the second terminal of the connector are electrically connected to a cable of the vehicle.

13. The vehicular camera according to claim 12, wherein the connector is a coaxial connector, the first terminal of the connector is a ground connection terminal, and the second terminal of the connector is a signal terminal.

14. The vehicular camera according to claim 1, wherein the first shape of the circuit board is a first quadrilateral shape, the second shape of the first bottom surface portion of the shield is a second quadrilateral shape, and the third shape of the hole of the shield is a circular shape.

15. The vehicular camera according to claim 1, wherein the magnetic material of the resin member is ferrite.

16. The vehicular camera according to claim 1, wherein the housing is molded with a resin.

17. The vehicular camera according to claim 1, wherein the lens unit is molded with a resin.

18. The vehicular camera according to claim 1, wherein the lens unit includes a first tubular portion configured to accommodate the lens, and a flange portion disposed outside the first tubular portion to extend outward with reference to the optical axis over an entire circumference centering on the optical axis, the flange portion includes a first flange surface, and a second flange surface opposite to the first flange surface, and the housing includes a first end, and a second end that is opposite to the first end and disposed at a position farther than the first end with reference to the lens unit.

19. The vehicular camera according to claim 1, wherein the number of pixels of the imaging element is 1 mega-pixel or more.

20. The vehicular camera according to claim 19, wherein the imaging element is a CMOS image sensor.

* * * * *